April 13, 1954 R. DUTTON-FORSHAW 2,675,258
SEAL RING
Filed Dec. 2, 1950 2 Sheets-Sheet 1
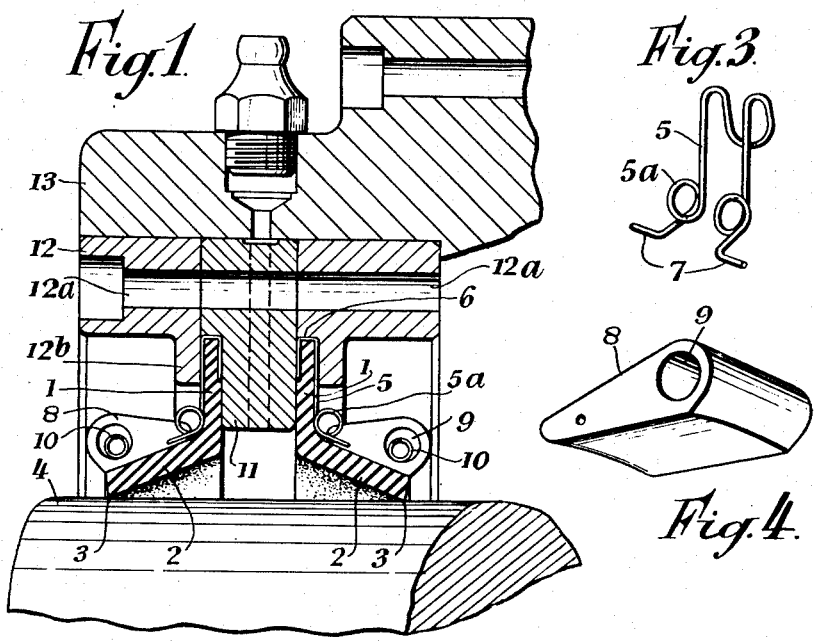
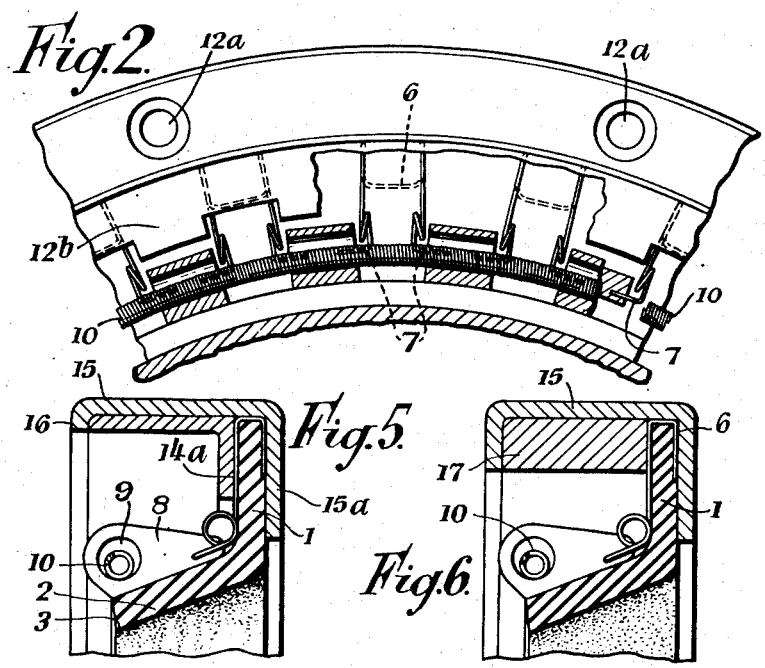
INVENTOR
Richard Dutton-Forshaw
BY Ross & Ross
Atty. & Agent Patented Apr. 13, 1954

2,675,258

UNITED STATES PATENT OFFICE 2,675,258

SEAL RING

Richard Dutton-Forshaw, Walton-on-the-Hill, Tadworth, Surrey, England

Application December 2, 1950, Serial No. 198,800

1 Claim. (Cl. 288—3)

This invention is concerned with packing or sealing rings, or washers for use on shafts and/or in bearings, and the like, to exclude or confine oil or other fluid matter, and/or to exclude dirt. Most usually these rings or washers (hereinafter referred to as sealing rings) are adapted to be fixed in a bore and to fit movably over a shaft or the like rotating and/or sliding in that bore, but the sealing rings are sometimes employed also in fixed positions on a shaft or the like, to rotate and/or slide in a bore. Both these forms of sealing rings are comprehended within the scope of the present invention.

The invention relates to that type of sealing ring which has a flexible rubber, leather or similar element of annular form, one part of which element is held fixedly in a metal or other rigid frame or holder, and another part of which is left free, as a resilient or elastic lip to bear on the member to be sealed, a garter spring of helical form being provided around said lip, to exert a radial pressure on such lip and thereby increase the sealing efficiency.

The invention is more particularly concerned with sealing rings of the larger types, as used for example on the necks or trunnions of rolling-mill rollers, and in other and more-or-less similar circumstances. The invention has for its main object to provide forms of sealing ring which have a more perfect "follow-up" than those hitherto known, so that they will continue to have the same sealing efficiency despite even excessive wear of the parts being sealed, and so that, in the event of any sudden radial displacement of the shaft or bearing they will maintain the seal and not leave a temporary gap between the shaft or bearing and the flexible lip of the sealing ring. Both these problems are relevant to a rolling mill bearing, since there is often excessive wear of the part on which the sealing ring fits and because there is often a jerky, transverse or radial displacement of the roll necks or trunnions relatively to the housings in which the sealing rings are held.

Sealing or packing rings of these larger sizes are of a relatively-expensive character and it is therefore desirable that the flexible annular element of the ring be separately removable for renewal, without requiring renewal of the whole seal. Sealing rings are already known which have removable flexible members, but they have not had a sufficiently rapid or spontaneous "follow-up," to allow of sudden transverse displacement of the shaft being sealed, and to prevent any temporary gap in the seal. Again, it has been possible, with some known sealing rings, for the garter spring to become loose and thereafter to be entrapped in an adjacent bearing with which the seal is associated, with consequent costly damage to the bearing. The present invention has for its object the provision of improved sealing rings which satisfy all the above-stated requirements and eliminate the said risk of damage.

According to this invention, the garter spring is held around the lip portion of the flexible annular sealing element, by engagement with a number of circumferentially-arranged shoes or holders, lying on or against such lip each of which shoes or holders is held in place by means of a positioning member or members carried by (in or on) the flexible annular element itself.

Preferably, the parts are so disposed that the central axis of the garter spring is in the same transverse plane (or approximately so) as the sealing edge of said lip portion. Also, the said positioning member or members may be adapted to exert a pressure on the shoes to urge them radially against the flexible sealing lip.

In the preferred forms of the invention, the garter spring passes through holes in a plurality of shoes lying on the flexible sealing member, and themselves held in position against such member by spring means which, in some cases, tends to maintain them in pressure contact with said lip portion. There may be a separate spring member for each shoe, or each pair of adjacent shoes, or there may be a single annular positioning member, embedded in the ring, for locating all of the shoes, either by direct engagement or by the use of intermediate connecting members.

Conveniently, a series of circumferentially-arranged springs co-operates with the shoes, each spring being embedded in the rubber ring, and each having protruding parts which engage a shoe on each side of it, the whole assembly thus comprising spring, shoe, spring, shoe, and so on, around the flexible member. In some other forms, instead of the said springs themselves being embedded in the rubber, they engage (e. g. hookwise) successive loops of an annular looped member which is partially embedded in the rubber.

According to a further feature of the invention the springs for the shoes are mounted on the lip-like portion of the flexible sealing element (which may be of rubber, synthetic rubber, leather or the like) and are prestressed so that, with such sealing member in its normal position, they exert a radial pressure on the shoes and therefore between the shoes and the sealing lip. In some forms of the invention, each sealing member has a radially-disposed flange adapted to be clamped in position between two ring-like members and the said springs each have a hook-like formation to be passed on to such flange, the springs thus being held in position by the same means which clamp the said flange in position. The flexible member may be independently removable, or it may be permanently held in a metal casing (unitary or composite) which is itself removable from the housing.

According to a further feature of the invention, the sealing ring has, integrally with the said radial flange and flexible sealing lip, a circumferential flange in which one or more annular reinforcing elements are moulded, and the positioning members for the said shoes are held in one or other of such flanges by being partially embedded therein.

The said shoes may be made of metal, or of compressed fibre, or a hard rubber or rubber-like substance, or of a moulded plastic, or of any other suitable oil-resistant material, and each will have its underside slightly concave in one direction, so as to lie on the curved inclined lip portion of the sealing member. In a modification, the shoes may be made with a spring jaw, so that a pre-formed endless garter spring may be "snapped" into them.

The invention will now be described in more detail with reference to the accompanying drawing, wherein:

Figure 1 is a longitudinal section through one part of a sealing ring according to one form of the invention, and including a portion of the surrounding housing;

Figure 2 is a part-sectional face view of the same;

Figure 3 is a perspective view of one of the springs for the shoes as shown in Figures 1 and 2; and Figure 4 is a perspective view of one of the shoes;

Figures 5 and 6 are cross-sectional views of parts of two other forms of sealing ring made according to the invention.

Figure 7:
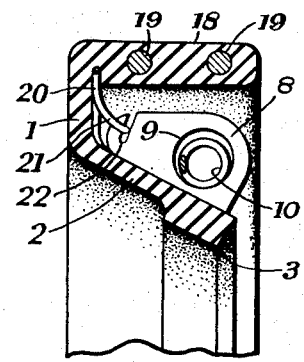
Figures 7 and 8 are like views to Figures 5 and 6, showing still other forms of sealing ring.

As shown in Figure 1 there are two flexible annular elements, arranged back to back with a metal spacing ring between them. Each flexible element has a flat radially-disposed portion 1 and an integral inclined portion 2, the latter terminating in a sharp lip 3 which, in use, engages the shaft 4 to be sealed. The part 1 may be of a harder or tougher material than the part 2, say of a harder rubber, and either or both may be reinforced internally. Placed on the outer edge of the said radially-disposed portion 1, are a number of wire springs 5, each of which has a turned-over loop 6 by which it hooks on to the edge of the sealing member.

On that side of the sealing member adjacent the inclined portion 2, each spring 5 has two parallel limbs extending down the face of the sealing member, then coiled at 5a and afterwards extending forwardly over the inclined portion 2 of the sealing member for a short distance, and finally bent outwardly as a projecting pin 7. This is more clearly seen in Figure 3.

Resting on the inclined portion 2 of the sealing member are a number of fibre shoes 8, there being one shoe 8 between each two consecutive springs 5, and the said outstanding pins 7 of the springs 5 entering holes in the side faces of the shoes. The springs 5 are so shaped that, when in engagement with the shoes 8, their forwardly-extending parts are stressed, thereby pressing the shoes 8 downwards on to the inclined portion 2 of the sealing member. The shoes 8 increase in thickness (radially) from the back (where they are held by the springs 5) to the front, and their upper portion overhangs the free edge 3 of the sealing member. There is a through hole 9 from side to side of each shoe 8, of circular cross-section, and a helical garter spring 10 is threaded through these holes 9 in the several shoes, the ends of that spring 10 then being joined together in known manner. The parts are so dimensioned that the central axis of the garter spring 10 is just above the shaft-engaging lip 3 of the sealing member. The holes 9 in the shoes 8 are of larger diameter than the garter spring 10.

There are two sealing elements, each equipped with springs 5 and shoes 8 as above described, and these elements are arranged back to back with a metal ring 11 between them. The assembly is sandwiched between two outer metal rings 12, the whole being bolted together to form a composite sealing unit. Holes 12a are shown for the connecting bolts, and the assembly is housed in the bearing frame 13. The said outer metal rings 12 each can have an inward flange 12b to lie over the sealing member 2 and over the outer parts of the shoe-holding springs 5, such flange 12b being notched or gapped at intervals to accommodate the coiled parts of the springs. It will be understood that the loops 6 grip the element 1 sufficiently tightly to retain their position, but when the assembly is finally bolted together, any loosening or shifting of those springs becomes impossible.

Referring now to Figure 5, a sealing member 1, 2 equipped with shoes 8 and springs 5 as in the first example, is gripped between the radially-disposed flanges 14a, 15a of inner and outer angle sectioned rings 14, 15 the circumferential flange of the outer ring 15 being longer than the corresponding flange of the inner ring 14, and being rolled over the edge of that flange at 16. The radial flange 14a of the inner ring 14 is notched on its inner edge to accommodate the coils of the shoe-holding springs 5.

In the example of Figure 6, the inner angle-sectioned ring 14 of the second example (Figure 5) is replaced by a stout ring 17 of rectangular section, the outer ring 15 being rolled over the edge of such rectangular ring 17 down to its inner periphery.

In use, the garter spring 10 is held by the shoes 8 in its most effective position and, should the shaft 4 tend to move away from the sealing lip 3, due say to wear or to temporary radial displacement, the shoes 8 and their springs 5 keep the lip 3 pressed against the shaft, and no interruption of the seal occurs. The shoes 8 act as so many pressure fingers, pressing the lip 2 inwards, and should that lip be temporarily unsupported, as by sudden displacement of the shaft 4, the fingers keep the lip up against the shaft, the large holes 9 allowing of inward movement of the shoes 8 in advance of inward movement of the garter spring 10.

Figure 8:
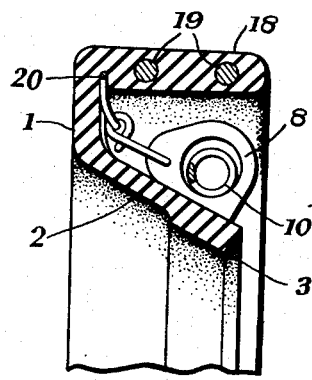

Referring now to Figures 7 and 8, the moulded element 1, 2 has in integral circumferential flange 18, in which are two intermoulded metal reinforcing rings 19. The overall width of the said flange 18 is slightly greater than that of the inner portions of the ring.

Figure 9:
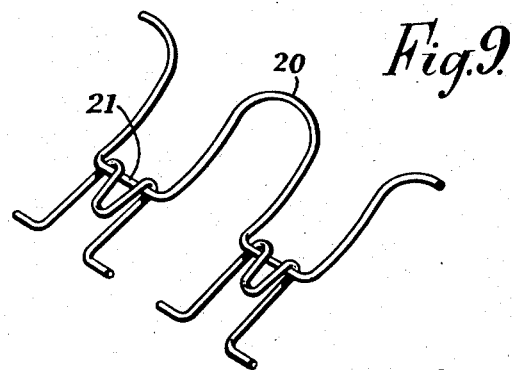
Figure 9 is a perspective view of a part of the shoe-locating means shown in Figure 8.

Moulded into the rubber is an annular wire-looped member 20, shown more clearly in Figure 9, the inner loops 21 of which are exposed and are curved forwardly. In Figure 7, these loops engage into slots 22 in the rear of the shoes 8, thus holding the shoes in position, whilst in Figure 8 the loops 21 receive the hook-shaped portions of springs 23 which in turn support the shoes 8 as do the springs 5 of Figures 1–3.

What I claim is:

A sealing ring for surrounding a shaft comprising, an annular member consisting of a radial body portion for disposition in a plane at right angles to the longitudinal axis of the shaft and a sealing lip portion extending downwardly away therefrom, a plurality of spring means spaced circumferentially about said annular member and each including an intermediate section adapted to be engaged with and supported by said radial body portion and a pair of spaced downwardly depending portions disposed over said sealing lip portion with the lowermost extremities thereof being turned laterally and outwardly away from each other, a plurality of shoes spaced circumferentially about the lip portion of said annular member alternatingly with said spring means, each of said shoes having an aperture extending transversely therethrough and being supported at its opposite sides by the lateral extremity of the adjacent said spring means, and an endless garter spring circumferentially arranged around said lip portion and extendable through the aligned transverse apertures of said shoes.

References Cited in the file of this patent

UNITED STATES PATENTS

| Number | Name | Date |
|---|---|---|
| 1,819,871 | Clark | Aug. 18, 1931 |
| 2,000,349 | Olsen | May 7, 1935 |
| 2,076,747 | Salisbury | Apr. 13, 1937 |
| 2,093,021 | Olsen | Sept. 14, 1937 |
| 2,434,484 | Chambers | Jan. 13, 1948 |
| 2,434,485 | Chambers | Jan. 13, 1948 |
| 2,466,533 | Chambers | Apr. 5, 1949 |

FOREIGN PATENTS

| Number | Country | Date |
|---|---|---|
| 562,767 | Great Britain | of 1944 |